United States Patent
Molenaar

(10) Patent No.: US 6,584,862 B1
(45) Date of Patent: Jul. 1, 2003

(54) ULTRASONIC FLOWMETER FOR FLOWING MEDIA

(75) Inventor: Marcel Meijlom Molenaar, Dordrecht (NL)

(73) Assignee: Krohne S.A., Romans-Cedex (NL)

( * ) Notice: Subject to any disclaimer, the term of this patent is extended or adjusted under 35 U.S.C. 154(b) by 0 days.

(21) Appl. No.: 09/699,544

(22) Filed: Oct. 30, 2000

(30) Foreign Application Priority Data

Oct. 28, 1999 (DE) .......................................... 199 51 874

(51) Int. Cl.⁷ ............................. G01F 1/66; G01D 21/00
(52) U.S. Cl. .................... 73/861.27; 73/866.5
(58) Field of Search ............................. 73/861.27, 861, 73/866.5, 861.18; 310/338, 327

(56) References Cited

U.S. PATENT DOCUMENTS

| | | | |
|---|---|---|---|
| 4,297,607 A | * 10/1981 | Lynnworth et al. | 310/334 |
| 4,410,825 A | * 10/1983 | Lobastov | 310/327 |
| 4,417,480 A | * 11/1983 | Zacharias, Jr. | 73/861.18 |
| 4,945,276 A | 7/1990 | Mylvaganam et al. | 310/326 |
| 5,515,733 A | 5/1996 | Lynnworth | 73/861.26 |
| 5,737,963 A | * 4/1998 | Eckert et al. | 73/290 |
| 5,814,736 A | 9/1998 | Loschberger et al. | |
| 5,989,275 A | * 11/1999 | Estabrook et al. | 604/22 |

FOREIGN PATENT DOCUMENTS

| | | |
|---|---|---|
| DE | 39 41 634 A | 6/1991 |
| DE | 3941634 | 6/1991 |
| DE | 44 43 415 A | 6/1996 |
| DE | 4443415 | 6/1996 |
| DE | 19601570 | 7/1997 |
| EP | 0344927 A1 | 12/1989 |
| EP | WO95/28618 | 10/1995 |
| EP | WO98/55838 | 12/1998 |

* cited by examiner

Primary Examiner—Hezron Williams
Assistant Examiner—Lilybett Martir

(57) ABSTRACT

Illustrated and described is an ultrasonic flowmeter for flowing media, that operates according to the transit time method, with a measuring tube and at least one transmitting and/or receiving head, in connection with which the transmitting and/or receiving head has a housing and an ultrasonic transducer with which ultrasonic signals can be emitted into the flowing medium and ultrasonic signals can be received from the flowing medium. The ultrasonic flowmeter for flowing media is characterized in that a damping device with at least one damping element is arranged around the sides of the housing of the transmitting and/or receiving head and at least partly adjacent to it, and the damping device is provided in a recess of the measuring tube.

14 Claims, 2 Drawing Sheets

ULTRASONIC FLOWMETER FOR FLOWING MEDIA

Figure 1:
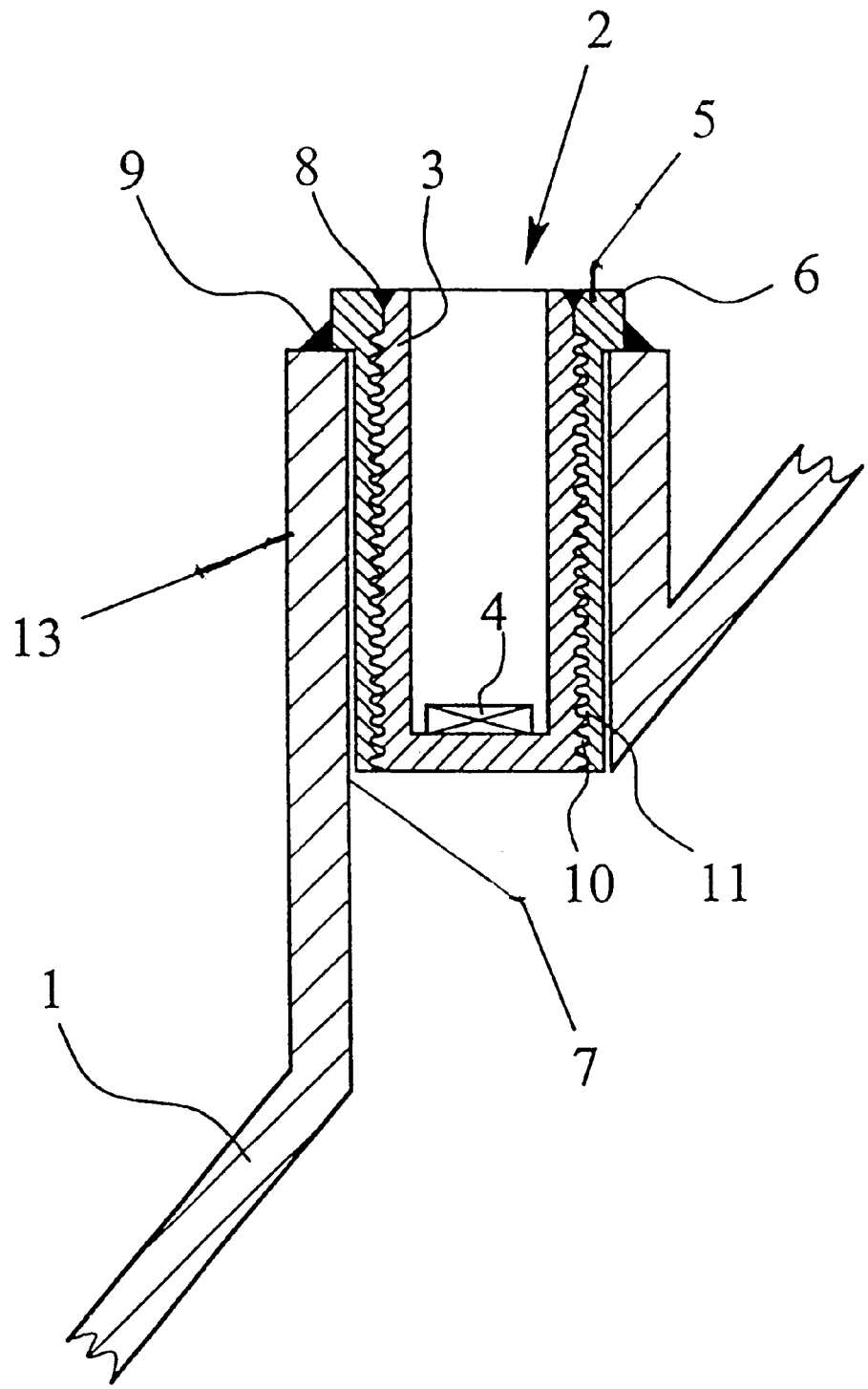

The invention relates to an ultrasonic flowmeter for flowing media, that operates according to the transit time method, with a measuring tube and at least one transmitting receiving head, in connection with which the transmitting and/or receiving head has a housing and an ultrasonic transducer by which ultrasonic signals can be emitted into the flowing medium and ultrasonic signals can be received from the flowing medium.

In industrial flow measuring of flowing media, i.e. of flowing liquids or flowing gases, the use of ultrasonic flowmeters has been gaining importance in recent times. In this connection, it is particularly advantageous, as is also the case with magnetic-inductive flowmeters, for the flow measuring to be able to take place in such a way that nothing needs to be inserted into the flow, such that the flow is not disturbed by the measurement.

In the case of ultrasonic flowmeters, as regards the measuring process a distinction is made above all between the transit time method, on the one hand, and the Doppler method, on the other hand. In this connection, the precision achievable with the transit time method is considerably greater than with the Doppler method. For this reason, ultrasonic flowmeters are preferably used that operate according to the transit time method, namely in particular according to the transit time difference method.

The transit time of an ultrasonic signal along the measuring path from the ultrasonic transducer emitting ultrasonic signals to the ultrasonic transducer receiving the ultrasonic signals in a liquid results from the acoustic velocity in the liquid or in the gas carried along in the liquid/gas as well as from the flow rate of the liquid and/or the gas carried along. The concerned principle of ultrasonic flow measuring according to the transit time method is derived from this. In the transit time difference method, ultrasonic signals are alternately or simultaneously transmitted upstream and downstream in the liquid and/or in the gas. Due to the different propagation rates, with the same length measuring path upstream and, respectively, downstream, the signals reach the ultrasonic transducers operating as receivers at different transit times. In this connection, the transit time difference of the two sound waves is directly proportional to the flow rate of the flowing medium.

For an ultrasonic flowmeter of a flowing medium, a measuring tube carrying the flowing medium and at least one ultrasonic transducer, preferably two ultrasonic transducers arranged staggered in the flow direction, and a control and evaluation circuit for determining the transit time of the ultrasonic signals are required. In addition, the control and evaluation circuit can calculate the flow rate, the flow volume and other parameters of the flowing medium from the transit time.

However, in ultrasonic flow measuring of a flowing medium there is not only the transfer, i.e. the emitting and receiving of ultrasonic signals that have run through the flowing medium, but also of ultrasonic signals that make their way beyond the measuring tube from the ultrasonic transducer emitting ultrasonic signals to the ultrasonic transducer receiving ultrasonic signals. This leads to a disturbance signal that considerably hinders the ultrasonic flow measurement under certain circumstances. The ultrasonic signal transferred beyond the measuring tube is particularly disruptive in particular because it is at least partially a coherent signal that cannot be treated as normal noise during the suppression.

To solve this problem, various suggestions have been made in the past to avoid the transfer of ultrasonic signals from the transmitting ultrasonic transducer to the receiving ultrasonic transducer beyond the measuring tube. In this connection, for example, it has been proposed to isolate the oscillating ultrasonic transducer from the measuring tube as much as possible in terms of vibration by means of rubber seals or similar devices for example. Similar approaches consisted in filling the space in which the ultrasonic transducer is arranged as far as possible with a damping material such as wax, rubber or plastic. In this respect, U.S. Pat. Nos. 4,410,825, 4,945,276 and 5,515,733 are referred to as examples.

Consequently, the invention is based on the technical problem of developing the known ultrasonic flowmeters in such a way that disturbances of ultrasonic flow measurement on a flowing medium due to ultrasonic signals transferred beyond the measuring tube are largely avoided.

The technical position deduced and described in the foregoing is solved according to the invention in that a damping device with at least one damping element is arranged around the sides of the housing of the transmitting and/or receiving head and at least partly adjacent to it, and the damping device is provided in a recess of the measuring tube.

According to the invention, the housing of the transmitting and/or receiving head in which the oscillating ultrasonic transducer is arranged is thus not directly connected with the measuring tube, but rather by means of a damping device, in such a way that the ultrasonic signals are fed into the measuring tube only through the damping device. The transition from the housing into the damping device, which is indeed connected mechanically with the housing but is not designed in one piece with it according to the invention, leads to a considerable reduction of the ultrasonic signal when it goes through the boundary surface between the housing and the damping device. In addition, signal coherence is also considerably reduced due to the dispersion of the sound at the boundary surface.

The inside of the measuring tube can already be sufficiently sealed off from the surroundings by the contact of the housing with the damping element as well as by the contact of the damping element with the measuring tube. If greater demands are made on the tightness of the ultrasonic flowmeter, however, the ultrasonic flowmeter according to the invention is preferably further developed by providing a seal between the housing and the damping device, on the one hand, and between the damping device and the measuring tube, on the other hand.

The housing can be inserted or slid into the damping device, for example, by having a recess designed in the damping device in conical shape corresponding to the outside of the housing. The housing preferably has an external screw thread and the damping device an internal screw thread, however, in such a way that the housing can be screwed with its external thread into the internal thread of the damping device. This enables the damping device to be particularly firmly seated in the housing, with the screwing having an additional sealing effect. In addition, the boundary surface between the housing and the damping device is substantially enlarged by the screwing, which has a positive effect on the damping of the ultrasonic signal penetrating the boundary surface and helps to reduce its coherence.

The size of the boundary surface through which the ultrasonic signals must pass in order to make their way from the ultrasonic transducer into the measuring tube can be further increased by the damping device having several damping elements nested into each other and at least partially contiguous. In this way, the ultrasonic signal must penetrate several consecutive boundary layers on its way from the ultrasonic transducer in order to arrive in the measuring tube.

The damping elements themselves can be sealing, if they are firmly inserted or screwed into each other, for example. However, a seal is preferably attached between each of the damping elements.

The measuring tube, the housing and the damping device with the damping elements can be made of numerous materials that only need to meet the requirements of a corresponding pressure resistance and a chemical resistance to the flowing medium. However, the measuring tube, the housing and at least one damping element preferably consist of a metal, preferably special steel.

Contiguous components, i.e. the measuring tube, the housing or the damping elements which are both designed of metal are preferably provided with sealing by being welded together.

It is also provided for, however, to have at least one damping element made of plastic, which leads to an additional damping of the ultrasonic signal due to an increased absorption of the ultrasonic signal in the plastic. Furthermore, a damping element designed of plastic that is provided firmly and tightly between two metal components can be used at the same time as a seal.

In particular when using at least one damping element of plastic, at least one of the seals is preferably rubber or plastic, with O-ring-seals of Viton being particularly useful.

A particularly reduced transmission of the ultrasonic signal to the measuring tube through the damping device is achieved when the damping device is attached to the measuring tube only on its side facing away from the ultrasonic transducer. With such a construction, before the ultrasound can penetrate the measuring tube, it must pass through the entire length of the housing and/or the damping device, thus resulting in an increased sound damping.

The damping device can be arranged directly in a recess of the measuring tube, but it is preferable for the measuring tube to have a connecting piece in which the damping device is mounted. In this connection, it is particularly preferable to arrange the damping device in the connecting piece at a distance from its inner wall in such a way that the above-described effect occurs, namely that the ultrasound must pass through the entire length of the housing and/or the damping device before it enters the connecting piece or the measuring tube. In this respect, a particularly advantageous arrangement is achieved when the damping device is connected with the connecting piece only at its free end. If the connecting piece and at least the outermost damping element are both made of metal, there is preferably a connection of the outermost damping element with the connecting piece by a weld seam that has a sealing effect at the same time.

In detail, there are numerous possibilities to design and further develop the invention's ultrasonic flowmeter for flowing media. For this, the patent claims subordinate to patent claim 1 are referred to, on the one hand, and, on the other hand, the description of preferred examples of execution of the invention in connection with the drawings.

Figure 2:
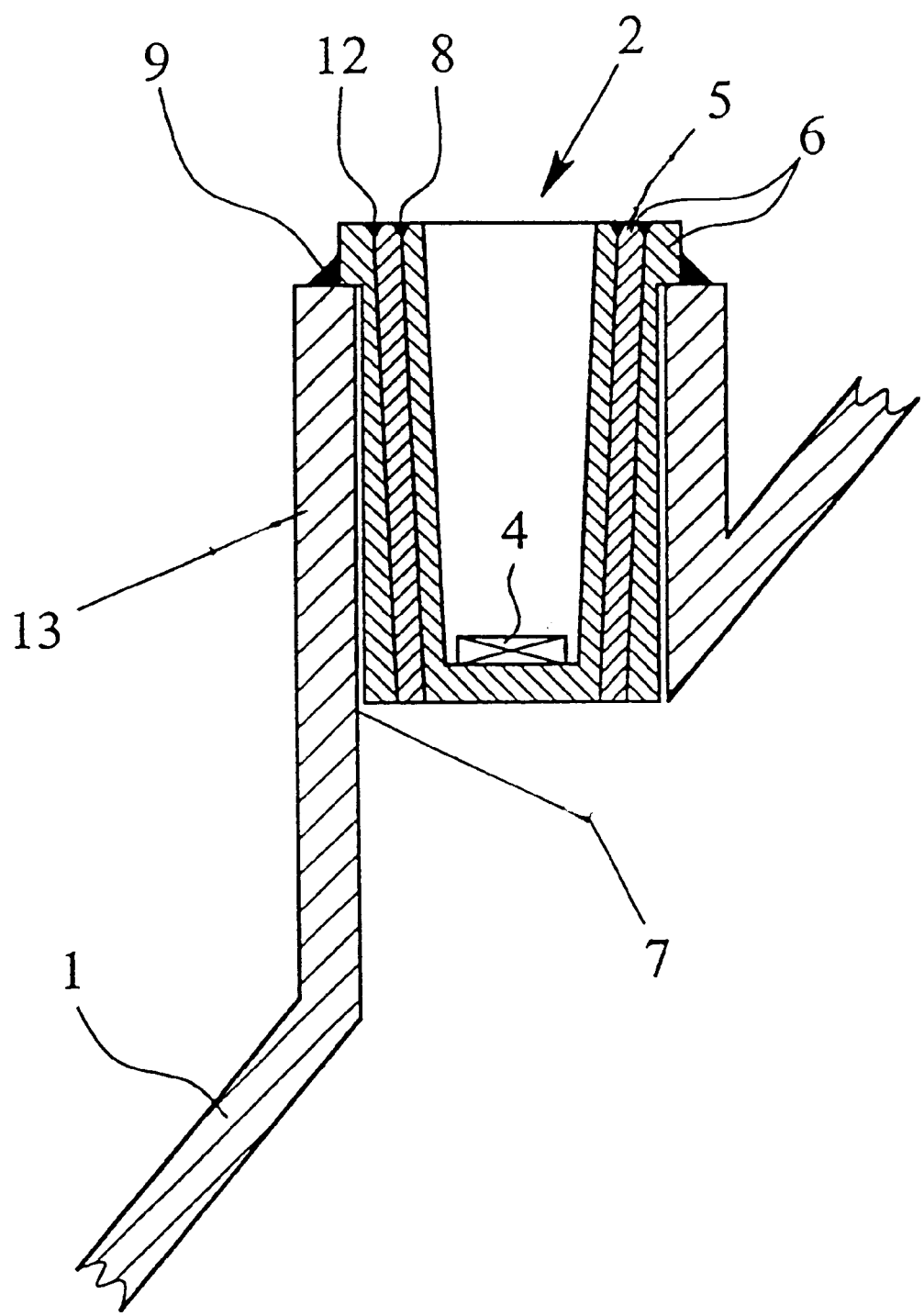

In the drawings,

FIG. 1 shows a section of an arrangement according to a first preferred embodiment of the invention, and FIG. 2 shows a section of an arrangement according to a second preferred invention embodiment.

FIG. 1 shows in a sectional view an arrangement according to a first preferred embodiment of the invention. A measuring tube 1 to which a transmitting and/or receiving head 2 is attached that has a housing 3 and an ultrasonic transducer 4 is only hinted at. The ultrasonic transducer 4 is formed by a piezoelectric crystal in the present case. A damping device 5 is provided around the sides of the housing 3 of the transmitting and/or receiving head 2 and, according to the first preferred example of execution of the invention, it has precisely one damping element 6. The transmitting and/or receiving head 2 is arranged together with the damping device 5 in a recess 7 of the measuring tube 1. Ultrasonic signals are emitted through the recess 7 into the flowing medium or received from the flowing medium.

The arrangement according to the first preferred example of execution of the invention is sealed by means of seals 8 between the housing 3 and the damping device 5 as well as by means of seals 9 between the damping device 5 and the measuring tube 1. The housing 3, the damping device 5 consisting of the damping element 6, and the measuring tube 1 are made of special steel in this case, in such a way that the seal 8 and the seal 9 can be designed as weld seams. The housing 3 has an external screw thread 10, and the damping element 6 has an internal screw thread 11. With its external screw thread 10, the housing 3 is screwed into the internal screw thread 11 of the damping element 6 in such a way that a large boundary surface is obtained between the housing 3 and the damping element 6 and the housing 3 is firmly seated in the damping element 6.

According to the first preferred embodiment of the invention, an arrangement was chosen in which the measuring tube 1 has a connecting piece 13 into which the transmitting and/or receiving head 2 is inserted together with the damping device 5. The connecting piece 13 of the measuring tube 1 offers the advantage that the transmitting and/or receiving head 2 does not protrude into the flow so the flow is not disturbed by the ultrasonic flow measurement and thus the measuring result is not rendered inaccurate by the measuring device.

As can be seen in FIG. 1, the damping element 6 is connected with the connecting piece 13 only at its end facing away from the ultrasonic transducer 4, namely by means of a weld seam 9 that acts as a seal at the same time. The inner surface of the connecting piece 13 and the damping element 6 are arranged at a distance from each other in such a way that there can only be a transfer of the ultrasonic signal from the damping device 5 into the measuring tube 1 or into the connecting piece 13 at the damping device's end facing away from the ultrasonic transducer 4. As was already explained above, this causes an additional damping of the ultrasonic signal fed into the measuring tube 1.

FIG. 2 shows in sectional view an arrangement according to a second preferred embodiment of the invention. The design of the transmitting and/or receiving head 2 according to the second preferred embodiment corresponds essentially to the transmitting and/or receiving head 2 shown in FIG. 1 according to the first preferred embodiment. Unlike the arrangement seen in FIG. 1, however, in the present case a damping device 5 with several, namely two, damping elements is provided, in connection with which the damping device 5 and the housing 3 have no screw thread with which they can be screwed together. Instead, the two damping elements 6 nested into each other and the housing 3 are designed conically. In this way, the housing 3 and the damping elements 6 can simply be inserted into each other, thus achieving a good hold of the housing 3 in the damping device 5, on the one hand and, on the other hand, already a certain degree of sealing.

The housing 3, the damping elements 6 and the measuring tube 1 with the connecting piece 13 are also made of special steel, as in the first preferred embodiment of the invention, in such a way that in each case a weld seam is designed as the seal 8 between the housing 3 and the innermost damping element 6, as the seal 9 between the outermost damping element 6 and the connecting piece 13 of the measuring tube 1 and as the seal 12 between the two damping elements 6.

What is claimed is:

1. An ultrasonic flowmeter for flowing media, that operates according to the transit time method, with a measuring tube and at least one transmitting-receiving head, wherein the transmitting-receiving head has a housing and an ultrasonic transducer with which ultrasonic signals are emitted into the flowing medium and ultrasonic signals are received from the flowing medium, wherein a damping device with at least one damping element is arranged around the outside of the housing of the transmitting-receiving head and in direct contact said housing, the damping device is provided in a recess of the measuring tube and attached to the measuring tube, the housing has an external screw thread, the damping device has an internal screw thread and the housing is screwed with its external screw thread into the internal screw thread of the damping device such that the housing is only connected to the measuring tube via the damping element having the effect that the ultrasonic signals are fed into the measuring tube only through the damping device.

2. The ultrasonic flowmeter according to claim 1, wherein the damping device has several damping elements nested into each other and at least partly contiguous.

3. The ultrasonic flowmeter according to claim 1, wherein the damping device is attached to the measuring tube only at its side facing away from the ultrasonic transducer.

4. The ultrasonic flowmeter according to claim 1, wherein the recess of the measuring tube has a connecting piece in which the damping device is arranged, and wherein the damping device is arranged in the connecting piece at a distance from its inner wall.

5. The ultrasonic flowmeter according to claim 4, wherein the damping device is connected with the connecting piece only at a free end of the connecting piece facing away from the measuring tube.

6. An ultrasonic flowmeter for flowing media, that operates according to the transit time method, with a measuring tube and at least one transmitting-receiving head, wherein the transmitting-receiving head has a housing and an ultrasonic transducer with which ultrasonic signals are emitted into the flowing medium and ultrasonic signals are received from the flowing medium, a damping device with at least one damping element is arranged outside the housing around the sides of the housing of the transmitting-receiving head and at least partly adjacent to said housing, the damping device is provided in a recess of the measuring tube, the housing has an external screw thread, the damping device has an internal screw thread and the housing is screwed with its external screw thread of the damping device essentially over its entire length such that a large boundary surface is obtained between the housing and the damping element.

7. The ultrasonic flowmeter according to claim 6, wherein the damping device has several damping elements contiguously nested into each other.

8. The ultrasonic flowmeter according to claim 6, wherein the damping device is attached to the measuring tube only at its side facing away from the ultrasonic transducer.

9. The ultrasonic flowmeter according to claim 6, wherein the recess of the measuring tube has a connecting piece in which the damping device is arranged, and wherein the damping device is arranged in the connecting piece at a distance from its inner wall.

10. The ultrasonic flowmeter according to claim 9, wherein the damping device is connected with the connecting piece only at a free end of the connecting piece facing away from the measuring tube.

11. An ultrasonic flowmeter for flowing media, that operates according to the transit time method, with a measuring tube and at least one transmitting-receiving head, wherein the transmitting-receiving head has a housing and an ultrasonic transducer with which ultrasonic signals are emitted into the flowing medium and ultrasonic signals are received from the flowing medium, wherein a damping device with at least one damping element is arranged and attached to the measuring tube only at its side facing away from the ultrasonic transducer around the sides of the housing of the transmitting-receiving head and adjacent to said housing, the damping device is provided in a recess of the measuring tube and attached to the measuring tube only at its side facing away from the ultrasonic transducer, the housing has an external screw thread, the damping device has an internal screw thread and the housing is screwed with its external screw thread into the internal screw thread of the damping device.

12. The ultrasonic flowmeter according to claim 11, wherein the damping device has several damping elements nested into each other and at least partly contiguous.

13. The ultrasonic flowmeter according to claim 11, wherein the recess of the measuring tube has a connecting piece in which the damping device is arranged, and wherein the damping device is arranged in the connecting piece at a distance from its inner wall.

14. The ultrasonic flowmeter according to claim 13, wherein the damping device is connected with the connecting piece only at a free end of the connecting piece facing away from the measuring tube.

* * * * *